(12) United States Patent
Li et al.

(10) Patent No.: US 11,873,407 B2
(45) Date of Patent: Jan. 16, 2024

(54) DIKETOPYRROLOPYRROLE PIGMENT COMPOUND HAVING HIGH WEATHERING RESISTANCE AND PREPARATION METHOD THEROF

(71) Applicant: CINIC CHEMICALS (SHANGHAI) CO., LTD., Shanghai (CN)

(72) Inventors: Xiujuan Li, Shanghai (CN); Xiazhu Long, Shanghai (CN)

(73) Assignee: CINIC CHEMICALS (SHANGHAI) CO., LTD., Shanghai (CN)

( * ) Notice: Subject to any disclaimer, the term of this patent is extended or adjusted under 35 U.S.C. 154(b) by 578 days.

(21) Appl. No.: 16/760,197

(22) PCT Filed: Dec. 21, 2018

(86) PCT No.: PCT/CN2018/122685
§ 371 (c)(1),
(2) Date: Apr. 29, 2020

(87) PCT Pub. No.: WO2019/128868
PCT Pub. Date: Jul. 4, 2019

(65) Prior Publication Data
US 2021/0179855 A1 Jun. 17, 2021

(30) Foreign Application Priority Data

Dec. 25, 2017 (CN) .......................... 201711428394.0

(51) Int. Cl.
C09B 57/00 (2006.01)
C09B 67/04 (2006.01)

(52) U.S. Cl.
CPC ........ C09B 57/004 (2013.01); C09B 67/0002 (2013.01)

(58) Field of Classification Search
CPC .................................................. C09B 57/004
See application file for complete search history.

(56) References Cited

U.S. PATENT DOCUMENTS

| | | | |
|---|---|---|---|
| 4,415,685 A | 11/1983 | Iqbal et al. | |
| 4,579,949 A | 4/1986 | Rochat et al. | |
| 4,791,204 A | 12/1988 | Jost et al. | |
| 4,914,211 A | 4/1990 | Jost et al. | |
| 5,389,141 A * | 2/1995 | Chassot | C08K 5/3415 106/500 |
| 2007/0028807 A1* | 2/2007 | Wallquist | C09B 67/0033 106/494 |
| 2010/0032657 A1 | 2/2010 | Yanai | |

FOREIGN PATENT DOCUMENTS

| | | |
|---|---|---|
| CN | 1068362 C | 7/2001 |
| CN | 1665816 A | 9/2005 |
| CN | 1867313 A | 11/2006 |
| CN | 1871309 A | 11/2006 |
| CN | 101370876 A | 2/2009 |
| CN | 102666736 A | 9/2012 |
| CN | 108239421 A | 7/2018 |
| EP | 0094911 A2 | 11/1983 |
| EP | 0787730 A1 | 8/1997 |
| EP | 2495288 A1 | 9/2012 |
| JP | S57172937 A | 10/1982 |
| JP | S58210084 A | 12/1983 |
| JP | S62149759 A | 7/1987 |
| JP | 2007514798 A | 6/2007 |
| JP | 2007266285 A | 10/2007 |
| JP | 2008078247 A | 4/2008 |
| WO | 2004076456 A1 | 9/2004 |
| WO | 2005039515 A1 | 5/2005 |
| WO | 2005040284 A1 | 5/2005 |
| WO | 2011052617 A1 | 5/2011 |

* cited by examiner

*Primary Examiner* — Jennifer Wecker
*Assistant Examiner* — Michelle Adams
(74) *Attorney, Agent, or Firm* — COZEN O'CONNOR

(57) ABSTRACT

A diketopyrrolopyrrole pigment compound having high weather resistance, a preparation method therefor and a use thereof, which relate to the technical field of organic pigments. The diketopyrrolopyrrole pigment compound has the structural formula (I).

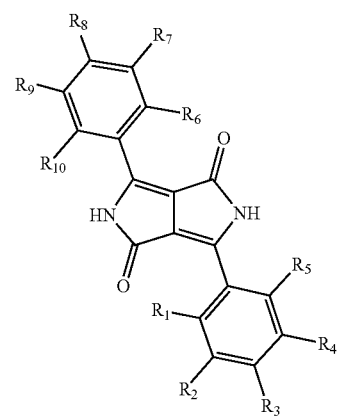

(1)

The described diketopyrrolopyrrole pigment compound may be directly used as a wet filter cake, or may be further formed into a flowing solid powder or granulated into a granulated preparation. In the various applications described, the diketopyrrolopyrrole pigment compound exhibits high saturation, good rheology, hiding power, and gloss, high tint strength, and particularly high weather resistance. The diketopyrrolopyrrole pigment compound having high weather resistance, the preparation method therefor and the use thereof have good market prospects.

12 Claims, No Drawings

DIKETOPYRROLOPYRROLE PIGMENT COMPOUND HAVING HIGH WEATHERING RESISTANCE AND PREPARATION METHOD THEROF

BACKGROUND OF THE INVENTION

1. Field of the Invention

The invention relates to the technical field of organic pigments, and more particularly, to a diketopyrrolopyrrole pigment compound having high weathering resistance, a preparation method therefor, and a use thereof.

2. Description of the Related Art

Pigments have long been used as colorants in the coloring of various polymer materials. The pigments are tailored to the needs of various systems by improving properties, such as color, coloring strength, dispersibility, gloss, fluidity, and weathering resistance.

It should be noted that the weathering resistance refers to the level of tolerance against the climate change when the pigments are used in a specific system. The worse the weathering resistance of the pigment, the easier it is to change color or fade. With the development of science and technology in various industries, a stricter requirement is posed on the functional performance of the pigment for the coloring of various polymer organic materials. More specifically, better weathering resistance is an important indicator for the performance. In practice, the weathering resistance needs to be improved without affecting the general use of the pigment in various systems.

1,4-diketopyrrolo [3,4-c] pyrrole pigment is a well-known pigment, and its synthesis method is disclosed in EP0094911. The diketopyrrolopyrrole pigment, such as PR254, exhibits excellent resistance, high brightness, good dispersibility, high color strength and color purity in various application systems. However, the following orange DPP pigments are available in the market, i.e., PO71, PO71, and PO81, and those pigments have been commercialized. Each of the orange pigments has some disadvantages, for example, PO71 has a poor saturation, and PO73 has an excellent saturation but its weathering resistance is not as good as expected. Therefore, it is difficult to uniform those different types of pigments. Further, the pigment, after being made into paint, is easier to become discolored upon exposure to air.

In the prior art, many companies, both home and abroad, provide methods for improving the weathering resistance of the diketopyrrolopyrrole pigment. For example, as disclosed in the Chinese patent CN 1068362C, the pigment is modified by using a complex of a metal, such as titanium or zirconium, however, it was found through trial and error that the weathering resistance is not improved by using the method. CN 101370876A discloses that the weathering resistance is improved by improving the distribution of particle sizes of products; however, the weathering resistance is slightly improved, and the property that the molecular structure is easily damaged cannot be improved. In addition, CN 1665816A discloses a new DPP structure in which coating fastness of coatings is improved; however, although it does not mention whether it is able to improve the weathering resistance, it can be determined from the structure that its solvent resistance is not desired, and it can only be used in a limited applications.

Thus, the prior art does not thoroughly solve the problem of poor weathering resistance of the diketopyrrolopyrrole pigment.

SUMMARY OF THE INVENTION

In order to overcome problems exist in the prior art, the present invention provides an orange diketopyrrolopyrrole pigment compound having high weathering resistance, a preparation method therefor; and a use thereof.

According to a first aspect of the invention, there is provided a diketopyrrolopyrrole pigment compound having high weathering resistance, wherein the diketopyrrolopyrrole pigment compound has the structural formula (I):

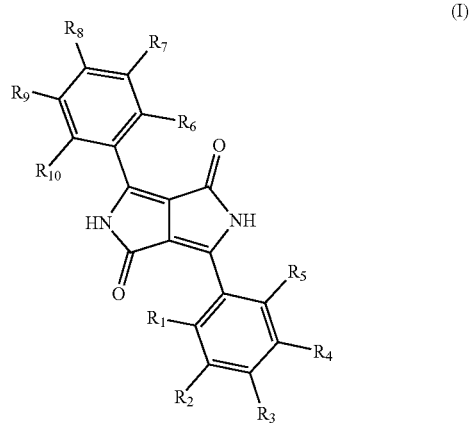

(I)

wherein, at least one electron-withdrawing group α in $R_1$-$R_5$ is one selected from the group consisting of halogen, cyano, carbonyl, carboxyl, ester, nitryl, sulfo, and at least one group of remaining groups in $R_1$-$R_5$ is one selected from the group consisting of H, C1-C30 alkyl, C6-C30 aryl, C5-C30 heteroaryl;

at least one electron-withdrawing group β in $R_6$-$R_{10}$ is one selected from the group consisting of halogen, cyano, carbonyl, carboxyl, ester, nitryl, sulfo, and at least one group of remaining groups in $R_6$-$R_{10}$ is one selected from the group consisting of H, C1-C30 alkyl, C6-C30 aryl, C5-C30 heteroaryl; and the type and number of the electron-withdrawing group α in $R_1$-$R_5$ are the same as those of the electron-withdrawing group β in $R_6$-$R_{10}$, and the type and number of the remaining groups in $R_1$-$R_5$ are also the same as those of the remaining groups in $R_6$-$R_{10}$.

Preferably, in the above-mentioned diketopyrrolopyrrole pigment compound, wherein the halogen is selected from the group consisting of fluorine, chlorine, bromine, and iodine.

Preferably, in the above-mentioned diketopyrrolopyrrole pigment compound, wherein the C1-C30 alkyl is one selected from the group consisting of methyl, ethyl, n-propyl, isopropyl, n-butyl, tert-butyl, cyclopropyl, cyclopentyl, cyclohexyl, dodecyl, octadecyl.

Preferably, in the above-mentioned diketopyrrolopyrrole pigment compound, wherein the C6-C30 aryl is one selected from the group consisting of phenyl, biphenyl, naphthyl, phenanthryl, anthracenyl, and indenyl.

Preferably, in the above-mentioned diketopyrrolopyrrole pigment compound, wherein the C5-C30 heteroaryl is one selected from the group consisting of furanyl, pyrrolyl, thiophenyl, pyridinyl, quinolyl, and isoquinolyl.

Preferably, in the above-mentioned diketopyrrolopyrrole pigment compound, wherein $R_2$, $R_4$, $R_7$, and $R_9$ have the same type, and each of $R_2$, $R_4$, $R_7$, and $R_9$ is one selected from the group consisting of halogen, cyano, and nitryl; and $R_3$ and $R_8$ have the same type, and each of $R_3$ and $R_8$ is one selected from the group consisting of methyl, ethyl, n-propyl, isopropyl, n-butyl, tert-butyl, cyclopropyl, cyclopentyl, cyclohexyl, dodecyl, octadecyl.

More preferably, the diketopyrrolopyrrole pigment compound is one selected from:

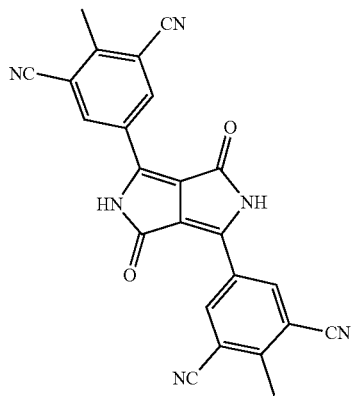

(I-1)

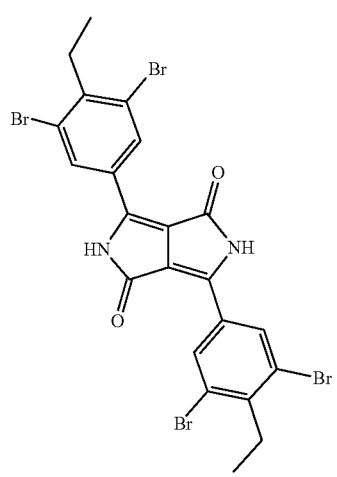

(I-2)

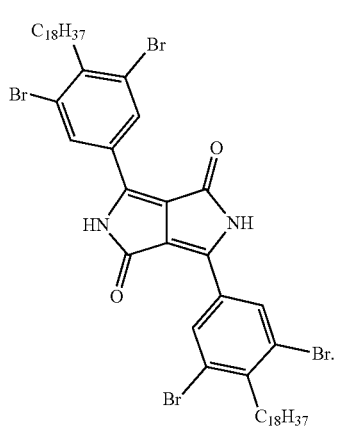

(I-6)

Preferably, in the above-mentioned diketopyrrolopyrrole pigment compound, wherein $R_1$, $R_5$, $R_6$, and $R_{10}$ have the same type, and each of $R_1$, $R_5$, $R_6$, and $R_{10}$ is one selected from the group consisting of halogen, cyano, and nitryl; and $R_3$ and $R_8$ have the same type, and each of $R_3$ and $R_8$ is one selected from the group consisting of phenyl, biphenyl, naphthyl, phenanthryl, anthracenyl, and indenyl.

More preferably, the diketopyrrolopyrrole pigment compound is:

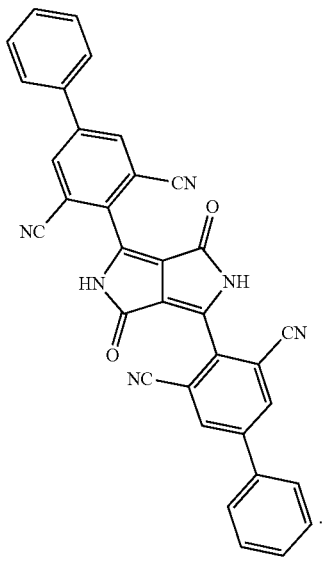

(I-9)

Preferably, in the above-mentioned diketopyrrolopyrrole pigment compound, wherein $R_3$ and $R_8$ have the same type, and each of $R_3$ and $R_8$ is one selected from the group consisting of methyl, ethyl, n-propyl, isopropyl, n-butyl, tert-butyl, cyclopropyl, cyclopentyl, cyclohexyl, dodecyl, octadecyl; and $R_2$ or $R_4$ is an electron-withdrawing group α, the electron-withdrawing group α is halogen or cyano; $R_7$ or $R_9$ is an electron-withdrawing group β, the electron-withdrawing group β is halogen or cyano, and the electron-withdrawing group α and the electron-withdrawing group β are the same.

More preferably, the diketopyrrolopyrrole pigment compound is:

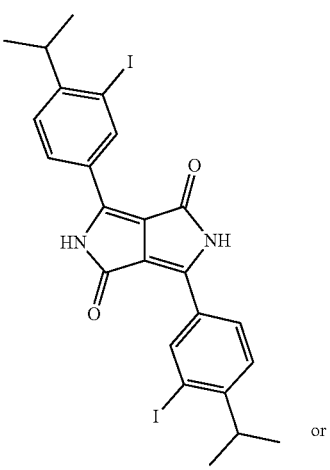

(I-3)

or

-continued

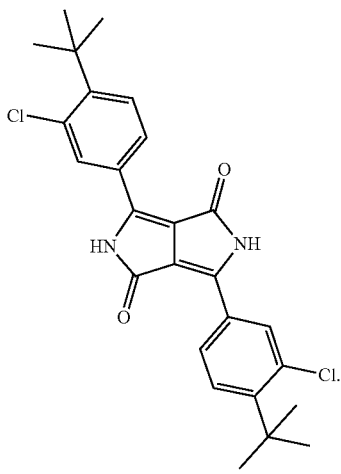

(I-7)

Preferably, in the above-mentioned diketopyrrolopyrrole pigment compound, wherein $R_3$ and $R_8$ have the same type, and each of $R_3$ and $R_8$ is one selected from the group consisting of halogen, cyano, and nitryl; and $R_2$, $R_4$, $R_7$, and $R_9$ have the same type, and each of $R_2$, $R_4$, $R_7$, and $R_9$ is one selected from the group consisting of methyl, ethyl, n-propyl, isopropyl, n-butyl, tert-butyl, cyclopropyl, cyclopentyl, cyclohexyl, dodecyl, octadecyl.

More preferably, the diketopyrrolopyrrole pigment compound is:

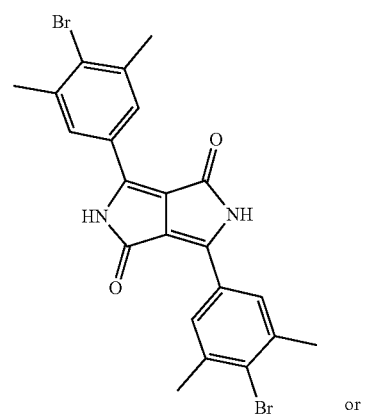

(I-11)

or

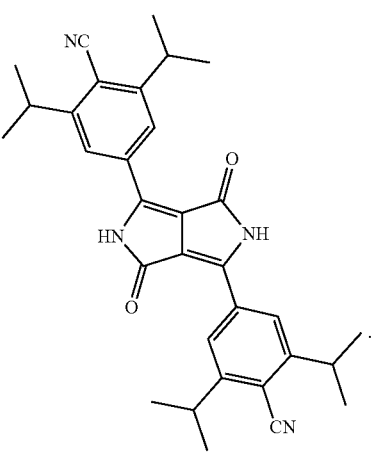

(I-12)

Preferably, in the above-mentioned diketopyrrolopyrrole pigment compound, wherein $R_3$ and $R_8$ have the same type, and each of $R_3$ and $R_8$ is one selected from the group consisting of halogen, cyano, and nitryl; and $R_2$ and $R_7$ have the same type, and each of $R_2$ and $R_7$ is one selected from the group consisting of methyl, ethyl, n-propyl, isopropyl, n-butyl, tert-butyl, cyclopropyl, cyclopentyl, cyclohexyl, dodecyl, octadecyl.

More preferably, the diketopyrrolopyrrole pigment compound is:

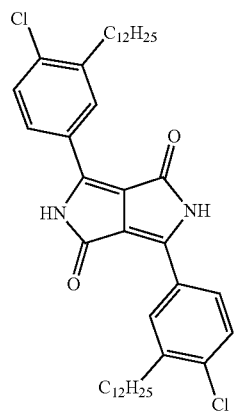

(I-10)

or

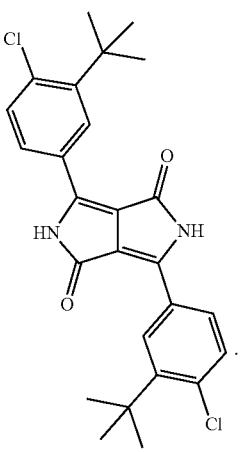

(I-14)

Preferably, in the above-mentioned diketopyrrolopyrrole pigment compound, wherein $R_3$ and $R_8$ have the same type, and each of $R_3$ and $R_8$ is one selected from the group consisting of methyl, ethyl, n-propyl, isopropyl, n-butyl, tert-butyl, cyclopropyl, cyclopentyl, cyclohexyl, dodecyl, octadecyl, phenyl, biphenyl, naphthyl, phenanthryl, and anthracenyl; and $R_1$, $R_4$, $R_6$, and $R_9$ are halogens.

More preferably, the diketopyrrolopyrrole pigment compound is:

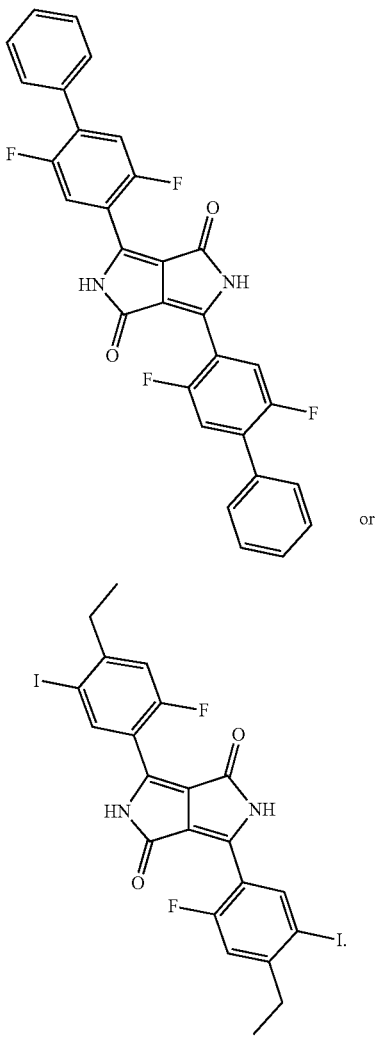

(1-4)

or (1-8)

Preferably, in the above-mentioned diketopyrrolopyrrole pigment compound, wherein $R_3$ and $R_8$ have the same type, and each of $R_3$ and $R_8$ is one selected from the group consisting of methyl, ethyl, n-propyl, isopropyl, n-butyl, tert-butyl, cyclopropyl, cyclopentyl, cyclohexyl, dodecyl, octadecyl, phenyl, biphenyl, naphthyl, phenanthryl, and anthracenyl; and $R_1$, $R_5$, $R_6$, and $R_{10}$ are halogens.

More preferably, the diketopyrrolopyrrole pigment compound is:

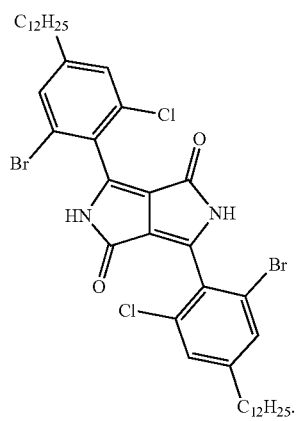

(I-5)

Preferably, in the above-mentioned diketopyrrolopyrrole pigment compound, wherein $R_3$ and $R_8$ have the same type, and each of $R_3$ and $R_8$ is either halogen or cyano; $R_4$ and $R_9$ have the same type, and each of $R_4$ and $R_9$ is one selected from the group consisting of methyl, ethyl, n-propyl, isopropyl, n-butyl, tert-butyl, cyclopropyl, cyclopentyl, cyclohexyl, dodecyl, octadecyl.

More preferably, the diketopyrrolopyrrole pigment compound is:

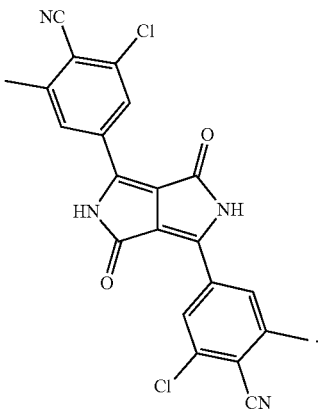

(I-13)

Furthermore, according to a second aspect of the invention, there is provided a method for preparing the diketopyrrolopyrrole pigment compound having high weathering resistance, comprising the steps of:

S1, mixing and reacting succinic acid diester with nitrile (II), and nitrile (III) in an organic solvent in the presence of alkali at a temperature of 60° C. to 180° C. to obtain a pigment alkali metal salt intermediate;

wherein the nitrile (II) is represented by the formula:

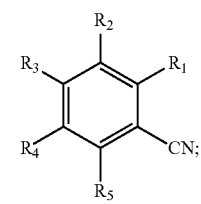

and the nitrile (III) is represented by the formula

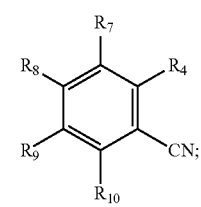

S2, mixing the pigment alkali metal salt intermediate with a hydrolysis solution, and performing hydrolysis at a temperature of −20° C. to 180° C., and performing post-treatment to obtain the diketopyrrolopyrrole pigment compound having high weathering resistance.

The preparation method is to mix the succinic acid diester, nitrile (II), and nitrile (III) and allow them to react, so as to obtain a pigment alkali metal salt intermediate; then the resulting pigment alkali metal salt intermediate undergoes the protonation of hydrolysis to convert disodium salt, which is used for the synthesis of the pigment, into the pigment of formula (I); finally, the obtained pigment is used in various application systems.

Preferably, in the above-mentioned preparation method, wherein a ratio of the weight of the organic solvent to the weight of the reactant is in a range from 2:1 to 50:1, and a molar ratio of the alkali to the succinic acid diester is in a range from 0.5:1 to 10:1.

Preferably, in the above-mentioned preparation method, wherein the succinic acid diester is one selected from the group consisting of dialkyl succinate, diaryl succinate, and monoalkyl monoaryl succinate.

More preferably, in the above-mentioned preparation method, wherein the dialkyl succinate is one selected from the group consisting of dimethyl succinate, diethyl succinate, diisopropyl succinate, di-tert-butyl succinate, diamyl succinate, and dicyclohexyl succinate.

More preferably, in the above-mentioned preparation method, wherein the organic solvent is one selected from the group consisting of an alcohol solvent, an ether solvent, and a polar aprotic solvent, or combinations thereof.

More preferably, in the above-mentioned preparation method, wherein the alcohol solvent is one selected from the group consisting of methanol, ethanol, n-propanol, isopropanol, n-butanol, 2-butanol, tert-butyl alcohol, tert-amyl alcohol, cyclohexanol, or combinations thereof, most preferably, tert-butyl alcohol or tert-amyl alcohol.

More preferably, in the above-mentioned preparation method, wherein the alcohol solvent is one selected from the group consisting of diethyl ether, methyl tert-butyl ether, tetrahydrofuran, and 2-methyltetrahydrofuran, or combinations thereof.

More preferably, in the above-mentioned preparation method, wherein the polar aprotic solvent is one selected from the group consisting of N, N-dimethylformamide, N, N-Dimethylacetamide, N-methylpyrrolidone, and dimethyl sulfoxide (DMSO), or combinations thereof.

More preferably, in the above-mentioned preparation method, wherein the alkali is one selected from the group consisting of alkali metal, alkali amide, alkali metal hydride, alkali metal alkoxide. Preferably, the alkali is sodium; more preferably, the alkali is methoxide, ethoxide, isopropoxide, tert-butoxide, tert-pentoxide of lithium, sodium, or potassium, or combinations thereof.

More preferably, in the above-mentioned preparation method, wherein the hydrolysis solution is one selected from the group consisting of water, alcohol, acid, or combinations thereof. It should be noted that the alcohol here preferably means alcohol having from 1 to 4 carbon atoms. The acid here may be an organic acid, an inorganic acid, or mixtures thereof, such as formic acid, acetic acid, benzoic acid, benzenesulfonic acid, hydrochloric acid, sulfuric acid, or phosphoric acid. A molar ratio of the acid to the base is in a range of 0 to 10, and after the hydrolysis, pH may be alkaline, neutral, or acidic. In addition, the hydrolysis process may be achieved by adding the hydrolysis solution to a reaction solution, or by adding the reaction solution to the hydrolysis solution.

Preferably, in the above-mentioned preparation method, wherein the post-treatment comprises the step of: performing heat treatment in water or the organic solvent or a mixture thereof at a temperature of 50° C. to 200° C. for 10 min to 8 h, and performing grinding process before, during, or after the post-treatment. Furthermore, the post-treatment further comprises a filtering step, for example, filtering step is followed by the heat treatment, or the heat treatment is followed by the filtering step.

According to a third aspect of the invention, there is provided a use of the diketopyrrolopyrrole pigment compound having high weathering resistance according to the first aspect of the invention. More specifically, the diketopyrrolopyrrole pigment compound is in the form of wet filter cakes, solid powders or granular formulations to be applicable for the coloring of plastics, resins, coating compositions, paints, printing inks, inkjet inks, electrophotographic toners, developers, and liquid crystals, and the pigment compound is orange. The diketopyrrolopyrrole pigment compound according to the present invention can be used directly as the wet filter cakes, or can be further made into free-flowing solid powders or be granulated into the granular formulations. The diketopyrrolopyrrole pigment compound according to the present invention exhibits the following properties in the above-mentioned applications, such as high saturation, high rheology, high hiding power, high gloss, high coloring power, in particularly, extremely high weathering resistance.

In conclusion, the invention provides an orange diketopyrrolopyrrole pigment with improved weathering resistance by adopting a molecular structural design. It is found through researches that the existing diketopyrrolopyrrole pigment is easy to fade due to the fact that the $\pi$ electron cloud of the central diketopyrrolopyrrole mother nucleus structure is vulnerable to external attacks, then the entire structure fades. In order to solve the above-mentioned problem, the molecular structure provided in the invention maintains alkyl, phenyl and other substituents on the benzene rings at both ends of the diketopyrrolopyrrole mother nucleus structure to keep the entire structure orange. In the meantime, electron-withdrawing groups, such as halogen, cyano, nitryl, sulfo, carbonyl, and carboxyl are simultaneously introduced, so that the density of the electron cloud of the central diketopyrrolopyrrole mother nucleus structure is reduced, and the possibility that a chromatic structure is damaged due to attacks from the outside conditions (e.g., some chemical substances or particular groups) is reduced.

In conclusion, the diketopyrrolopyrrole pigment compound having high weathering resistance, a preparation method therefor, and a use thereof according to the present invention have a great prospect.

The present invention will be further described below in conjunction with specific embodiments, but the present invention is not limited to the following embodiments.

EXAMPLE 1

8.2 mol anhydrous tert-amyl alcohol is added to a four-neck flask. After 3.5 mol sodium is added to the solution in the flask, the mixture is stirred under reflux until the sodium is completely reacted. 1.1 mol 3,5-dicyano-4-methylbenzonitrile is added to the reaction mixture at a temperature of 100° C. 1.6 mol diisopropyl succinate is added dropwise to the mixture at a temperature of 100° C. in an hour, following by mixing the mixture under reflux for 4 hours. After the reaction suspension is cooled to 80° C., the cooled reaction suspension is poured into a mixture of 500 ml water and 800 ml methanol at a temperature of 25° C. The hydrolyzed suspension is stirred under reflux for 6.5 hours, and acetic acid is added dropwise to the suspension to make the suspension neural. The suspension is filtered after it is cooled to room temperature, and the pigment is washed with 500 ml methanol and 1000 ml water. The wet filter cake is dried in an 80° C. vacuum oven until the moisture content is less than 0.1%. Finally, the dried filter cake is grinded to obtain 206 g diketopyrrolopyrrole pigment of formula (I-1).

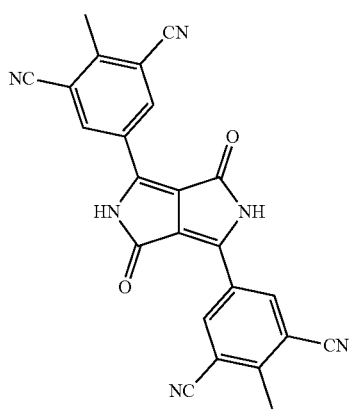

Formula (I-1)

Elemental analysis: C 68.66%; H 2.71%; N 19.57%.
MS(Maldi-ToF, positive mode): m/z 417.2 (100%), 418.2 (30.5%), 419.2 (7.8%).

EXAMPLE 2

8.0 mol anhydrous tert-amyl alcohol is added to a four-neck flask. After 4.0 mol sodium is added to the solution in the flask, and the mixture is stirred under reflux until the sodium is completely reacted. 1.0 mol 3,5-dibromo-4-ethylbenzonitrile is added to the reaction mixture at a temperature of 100° C. 1.5 mol di-tert-amyl succinate is added dropwise to the mixture at a temperature of 100° C. in an hour, following by mixing the mixture under reflux for 4 hours. After the reaction suspension is cooled to 80° C., the cooled reaction suspension is poured into a mixture of 600 ml water and 600 ml methanol at a temperature of 25° C. The hydrolyzed suspension is stirred under reflux for 5.5 hours, and acetic acid is added dropwise to the suspension to make the suspension neural. The suspension is filtered after it is cooled to room temperature, and the pigment is washed with 500 ml methanol and 800 ml water. The wet filter cake is dried in an 80° C. vacuum oven until the moisture content is less than 0.1%. Finally, the dried filter cake is grinded to obtain 279 g diketopyrrolopyrrole pigment of formula (I-2).

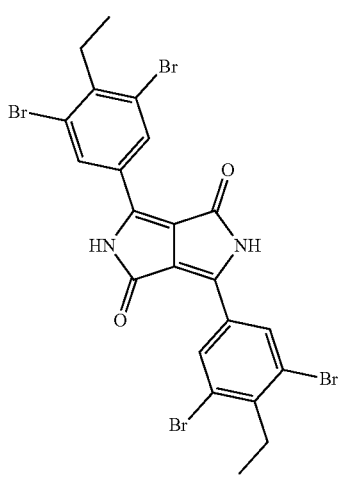

Formula (I-2)

Elemental analysis: C 39.55%; H 2.63%; N, 4.17%; Br 47.69%.
MS(Maldi-ToF, positive mode): m/z 660.6 (100%), 662.6 (66.5%), 658.6 (55.2%).

EXAMPLE 3

8.0 mol anhydrous tert-amyl alcohol is added to a four-neck flask. After 3.4 mol sodium is added to the solution in the flask, the mixture is stirred under reflux until the sodium is completely reacted. 1.2 mol 3-iodo-4-isopropylbenzonitrile is added to the reaction mixture at a temperature of 100° C. 1.2 mol di-tert-butyl succinate is added dropwise to the mixture at a temperature of 100° C. in half an hour, following by mixing the mixture under reflux for 4 hours. After the reaction suspension is cooled to 80° C., the cooled reaction suspension is poured into a mixture of 800 ml water and 500 ml methanol at a temperature of 25° C. The hydrolyzed suspension is stirred under reflux for 5.5 hours, and acetic acid is added dropwise to the suspension to make the suspension neural. The suspension is filtered after it is cooled to room temperature, and the pigment is washed with 500 ml methanol and 800 ml water. The wet filter cake is dried in an 80° C. vacuum oven until the moisture content is less than 0.1%. Finally, the dried filter cake is grinded to obtain 337 g diketopyrrolopyrrole pigment of formula (I-3).

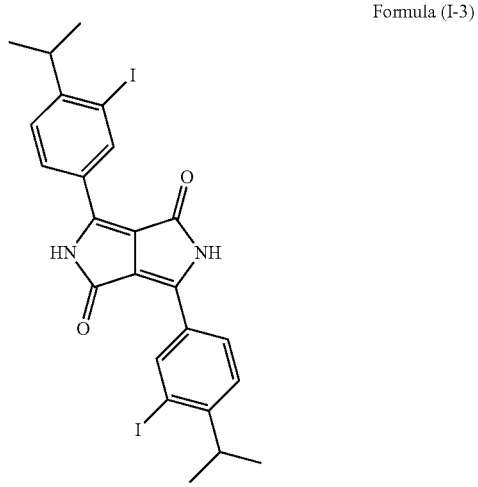 [SMILES: CC(C)c1ccc(C2=C3C(=O)NC(c4ccc(C(C)C)c(I)c4)=C3C(=O)N2)cc1I]

Formula (I-3)

Elemental analysis: C 47.52%; H 3.75%; N, 4.61%; I 41.19%.
MS(Maldi-ToF, positive mode): m/z 624.7 (100%), 625.7 (30.9%), 626.7 (5.5%).

EXAMPLE 4

16.0 mol anhydrous tert-amyl alcohol is added to a four-neck flask. After 7.2 mol sodium is added to the solution in the flask, the mixture is stirred under reflux until the sodium is completely reacted. 2 mol 3,6-difluoro-4-phenylbenzonitrile is added to the reaction mixture at a temperature of 100° C. 1.5 mol diisopropyl succinate is added dropwise to the mixture at a temperature of 100° C. in half an hour, following by mixing the mixture under reflux for 4 hours. After the reaction suspension is cooled to 80° C., the cooled reaction suspension is poured into a mixture of 1200 ml water and 800 ml methanol at a temperature of 25° C. The hydrolyzed suspension is stirred under reflux for 5.5 hours. The suspension is filtered after it is cooled to room temperature, and the pigment is washed with 900 ml methanol and 1500 ml water. The wet filter cake is dried in an 80° C. vacuum oven until the moisture content is less than 0.1%. Finally, the dried filter cake is grinded to obtain 460 g diketopyrrolopyrrole pigment of formula (I-4).

13

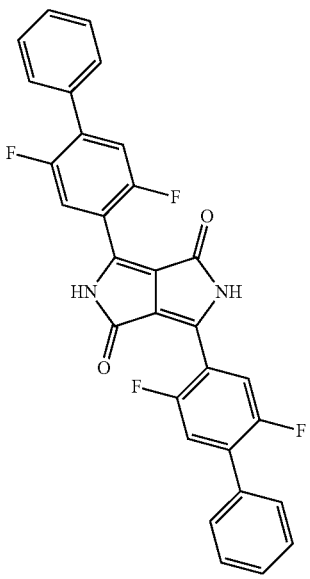

Formula (I-4)

Elemental analysis: C 70.22%; H 3.33%; N 5.39%; F 15.06%.

MS(Maldi-ToF, positive mode): m/z 513.3 (100%), 514.3 (30.9%), 515.3 (5.5%).

EXAMPLE 5

16.0 mol anhydrous tert-amyl alcohol is added to a four-neck flask. After 7.2 mol sodium is added to the solution in the flask, the mixture is stirred under reflux until the sodium is completely reacted. 3 mol 2-bromo-4-n-dodecyl-6-chlorobenzonitrile is added to the reaction mixture at a temperature of 100° C. 1.9 mol di-tert-butyl succinate is added dropwise to the mixture at a temperature of 100° C. in half an hour, following by mixing the mixture under reflux for 4 hours. After the reaction suspension is cooled to 80° C., the cooled reaction suspension is poured into a mixture of 1500 ml water and 1000 ml methanol at a temperature of 25° C. The hydrolyzed suspension is stirred under reflux for 5.5 hours. The suspension is filtered after it is cooled to room temperature, and the pigment is washed with 900 ml methanol and 1500 ml water. The wet filter cake is dried in a 100° C. vacuum oven until the moisture content is less than 0.1%. Finally, the dried filter cake is grinded to obtain 1085 g diketopyrrolopyrrole pigment of formula (I-5).

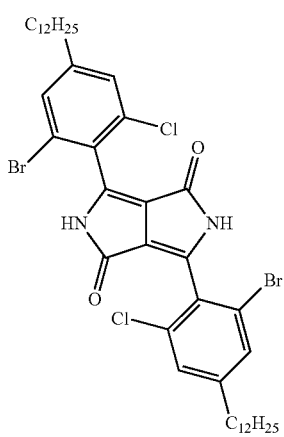

Formula (I-5)

Elemental analysis: C 58.77%; H 6.51%; N 3.46%; Br 18.95%; Cl 8.01%.

MS(Maldi-ToF, positive mode): m/z 851.3 (100%), 853.3 (78.6%), 852.3 (50.5%).

EXAMPLE 6

4.2 mol anhydrous tert-amyl alcohol is added to a four-neck flask. After 1.8 mol sodium is added to the solution in the flask, the mixture is stirred under reflux until the sodium is completely reacted. 1 mol 3,5-dibromo-4-n-octadecylbenzonitrile is added to the reaction mixture at a temperature of 100° C. 0.6 mol diisopropyl succinate is added dropwise to the mixture at a temperature of 100° C. in 0.3 hour, following by mixing the mixture under reflux for 6 hours. After the reaction suspension is cooled to 80° C., the cooled reaction suspension is poured into a mixture of 500 ml water and 800 ml methanol at a temperature of 25° C. The hydrolyzed suspension is stirred under reflux for 6 hours, and acetic acid is added dropwise to the suspension to make the suspension neural. The suspension is filtered after it is cooled to room temperature, and the pigment is washed with 500 ml methanol and 1000 ml water. The wet filter cake is dried in a 100° C. vacuum oven until the moisture content is less than 0.1%. Finally, the dried filter cake is grinded to obtain 502 g diketopyrrolopyrrole pigment of formula (I-6).

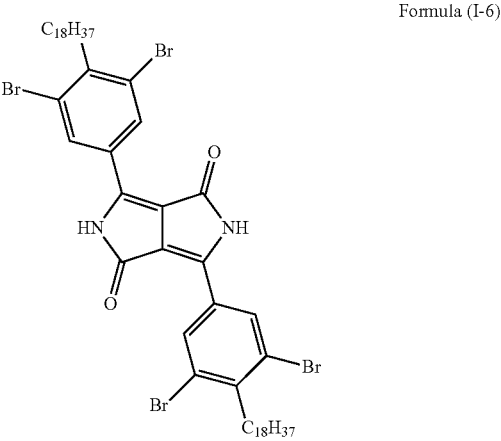

Formula (I-6)

Elemental analysis: C 59.27%; H 7.38%; N 2.60%; Br 28.73%.

MS(Maldi-ToF, positive mode): m/z 1109.5 (100%), 1107.3 (62.2%), 1111.3 (58.7%).

EXAMPLE 7

4.2 mol anhydrous tert-amyl alcohol is added to a four-neck flask. After 1.7 mol sodium is added to the solution in the flask, the mixture is stirred under reflux until the sodium is completely reacted. 1 mol 3-chloro-4-tert-butylbenzonitrile is added to the reaction mixture at a temperature of 100° C. 0.65 mol di-tert-butyl succinate is added dropwise to the mixture at a temperature of 100° C. in half an hour, following by mixing the mixture under reflux for 5 hours. After the reaction suspension is cooled to 80° C., the cooled reaction suspension is poured into a mixture of 500 ml water and 800 ml methanol at a temperature of 25° C. The hydrolyzed suspension is stirred under reflux for 5 hours. The suspension is filtered after it is cooled to room temperature, and the pigment is washed with 500 ml methanol and 1000 ml water. The wet filter cake is dried in a 100° C. vacuum oven until the moisture content is less than 0.1%. Finally, the dried filter cake is grinded to obtain 211 g diketopyrrolopyrrole pigment of formula (I-7).

Formula (I-7)

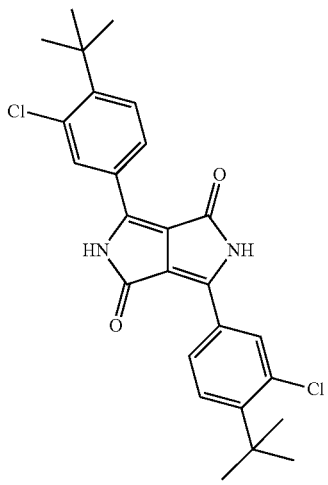

Elemental analysis: C 65.52%; H 5.51%; N 6.19%; Cl 15.55%.

MS(Maldi-ToF, positive mode): m/z 469.2 (100%), 470.2 (47.8%). 468.2 (46.7%).

EXAMPLE 8

8.5 mol anhydrous tert-amyl alcohol is added to a four-neck flask. After 3.5 mol sodium is added to the solution in the flask, the mixture is stirred under reflux until the sodium is completely reacted. 2 mol 3-iodo-4-ethyl-6-fluorobenzonitrile is added to the reaction mixture at a temperature of 100° C. 1.5 mol di-tert-amyl succinate is added dropwise to the mixture at a temperature of 100° C. in an hour, following by mixing the mixture under reflux for 8 hours. After the reaction suspension is cooled to 80° C., the cooled reaction suspension is poured into a mixture of 1000 ml water and 1500 ml methanol at a temperature of 25° C. The hydrolyzed suspension is stirred under reflux for 5 hours, and acetic acid is added dropwise to the suspension to make the suspension neural. The suspension is filtered after it is cooled to room temperature, and the pigment is washed with 800 ml methanol and 1500 ml water. The wet filter cake is dried in a 130° C. vacuum oven until the moisture content is less than 0.1%. Finally, the dried filter cake is grinded to obtain 569 g diketopyrrolopyrrole pigment of formula (I-8).

Formula (I-8)

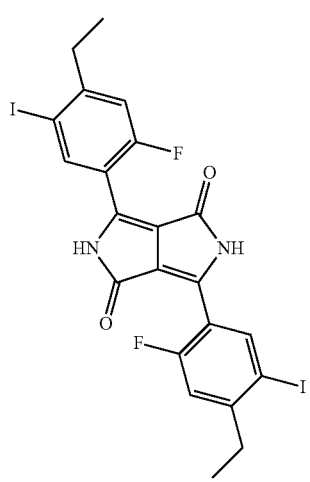

Elemental analysis: C 42.83%; H 2.85%; N 4.47%; I 41.03%; F 6.26%.

MS(Maldi-ToF, positive mode): m/z 632.9 (100%), 633.9 (28.5%), 634.9 (9.6%).

EXAMPLE 9

10 mol anhydrous tert-amyl alcohol is added to a four-neck flask. After 4 mol sodium is added to the solution in the flask, the mixture is stirred under reflux until the sodium is completely reacted. 2 mol 2,6-dicyano-4-phenylbenzonitrile is added to the reaction mixture at a temperature of 100° C. 1.8 mol diisopropyl succinate is added dropwise to the mixture at a temperature of 100° C. in an hour, following by mixing the mixture under reflux for 10 hours. After the reaction suspension is cooled to 80° C., the cooled reaction suspension is poured into a mixture of 1000 ml water and 1500 ml methanol at a temperature of 25° C. The hydrolyzed suspension is stirred under reflux for 8 hours. The suspension is filtered after it is cooled to room temperature, and the pigment is washed with 800 ml methanol and 1500 ml water. The wet filter cake is dried in a 130° C. vacuum oven until the moisture content is less than 0.1%. Finally, the dried filter cake is grinded to obtain 460 g diketopyrrolopyrrole pigment of formula (I-9).

Formula (I-9)

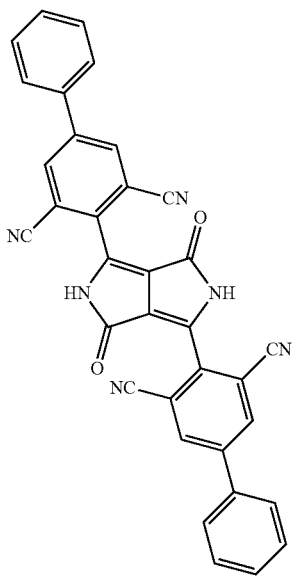

Elemental analysis: C 76.60%; H 3.06%; N 14.96%.

MS(Maldi-ToF, positive mode): m/z 541.2 (100%), 542.2 (44.1%), 543.2 (12.1%).

Weathering Resistance Test

EXAMPLE 10

The above-mentioned pigments are made into color cards according to the following methods, respectively, and a color paste is prepared from the following components in percentage by weight: 71% of water, 8% of BYK190, 1% of BYK021, and 20% of a pigment.

The method is as follows: the color paste is formulated proportionally as described, 1-1.2 mm zirconium beads are added. The mixture is stirred with a mixer at a high shear rate (at 1800-2100 rmp) for 120 minutes to well disperse the pigment, so that the pigment added can be dispersed into primitive particles; then it is filtered to obtain the color paste.

The color paste is diluted with Nippon water-based latex white paint (Nippon Odour-less 120) at a ratio of 10:1. The diluted coating is scraped onto a white cardboard and dried at a temperature of 80° C. for 30 minutes to obtain a color card for the weathering resistance test.

The color card of each sample is cut into two equal halves with a scissor, wherein a half of the A color card is sealed and stored, and the other half of the B color card is exposed to the outdoors for 3 months. The coloring strength of the B color card is tested based on the A color card, and the test result is shown in Table 1-1. The closer the coloring strength is to 100%, the better the wreathing resistance, and the lower the color strength, the worse the wreathing resistance. It can be seen from the Table 1-1 that the weathering resistance of the orange diketopyrrolopyrrole pigment according to the present invention is improved when compared with the sample pigment orange 73.

TABLE 1-1

| Sample | Coloring strength after exposure to outdoors for 3 months |
|---|---|
| Pigment orange 73 | 51.80% |
| Example 1 | 83.20% |
| Example 2 | 82.60% |
| Example 3 | 75.01% |
| Example 4 | 80.50% |
| Example 5 | 76.20% |
| Example 6 | 80.60% |
| Example 7 | 77.00% |
| Example 8 | 82.50% |
| Example 9 | 82.50% |

EXAMPLE 11

Based on the Example 10, the B color card is exposed to the outdoors for 6 months extended from the previous 3 months, and other operations remain the same. Then the coloring strength of the B color card is tested based on the A color card, and the test result is shown in Table 1-2. It can be seen from the Table 1-2 that the weathering resistance of the orange diketopyrrolopyrrole pigment according to the present invention is improved when compared with the sample pigment orange 73. In addition, due to the exposure time is extended to 6 months, the weathering resistance varies greatly, and it is clear that the compound (I-7) exhibits the optimum weathering resistance.

TABLE 1-2

| Sample | Coloring strength after exposure to outdoors for 6 months |
|---|---|
| Pigment orange 73 | 32.30% |
| Example 1 | 53.12% |
| Example 2 | 51.80% |
| Example 3 | 46.32% |
| Example 4 | 51.73% |
| Example 5 | 47.11% |
| Example 6 | 51.20% |
| Example 7 | 65.10% |
| Example 8 | 53.09% |
| Example 9 | 51.56% |

EXAMPLE 12

On the basis of Example 10, the following experimental conditions are changed while other operations remain the same:

the B color card is placed in an artificial accelerated aging instrument (Ci5000 type xenon lamp climate tester produced by American ATLAS company) for 720 hours. Conditions for the instrument: irradiance (340 nm) 0.35 W/m$^2$, relative humidity 50%, black standard temperature (65±2) ° C., rainfall cycle 18 min/102 min. Then the coloring strength of the B color card is tested based on the A color card, and the test result is shown in Table 1-3. It can be seen from the data in Table 1-3 that the weathering resistance of the orange diketopyrrolopyrrole pigment according to the present invention is greatly improved when compared with the sample pigment orange 73, and the compound (I-7) exhibits the optimum weathering resistance.

TABLE 1-3

| Sample | Placed in an artificial accelerated aging instrument for 720 hours |
|---|---|
| Pigment orange 73 | 41.50% |
| Example 1 | 66.31% |
| Example 2 | 66.65% |
| Example 3 | 61.44% |
| Example 4 | 66.68% |
| Example 5 | 63.21% |
| Example 6 | 66.85% |
| Example 7 | 71.61% |
| Example 8 | 66.78% |
| Example 9 | 67.99% |

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A diketopyrrolopyrrole pigment compound selected from the group consisting of

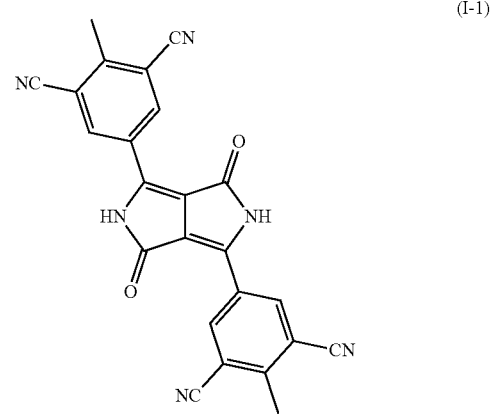

(I-1)

-continued
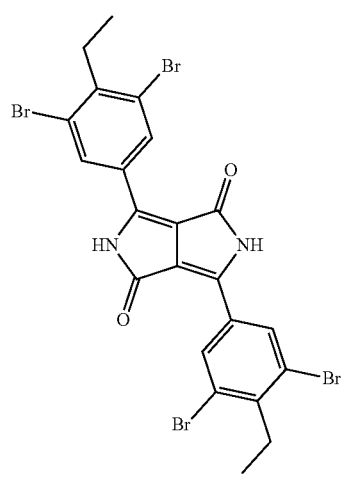 (I-2)
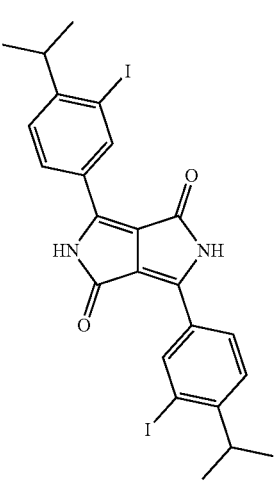 (I-3)
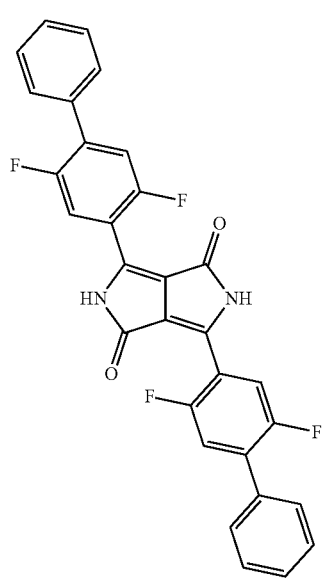 (I-4)
-continued
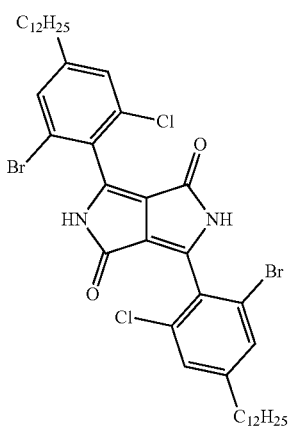 (I-5)
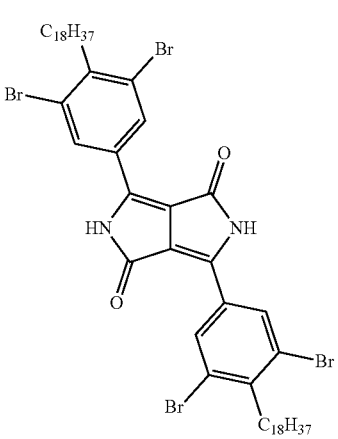 (I-6)
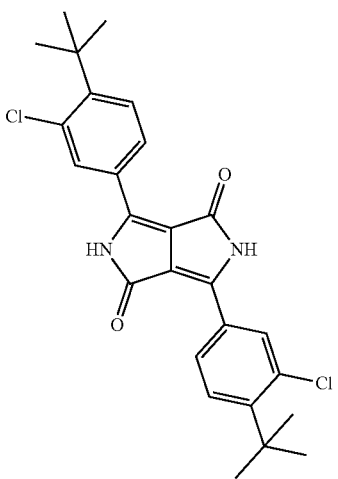 (I-7)

-continued

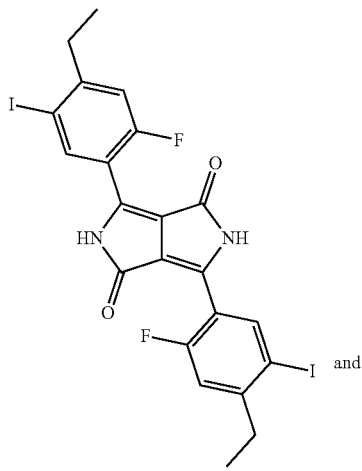
(I-8)

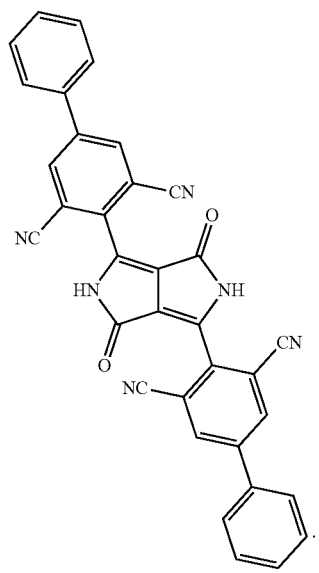
(I-9)

2. A method for preparing the diketopyrrolopyrrole pigment compound of claim 1, comprising:
S1, mixing and reacting succinic acid diester with a nitrile selected from 3,5-dicyano-4-methylbenzonitrile for compound (1-1), 3,5-dibromo-4-ethylbenzonitrile for compound (1-2), 3-iodo-4-isopropylbenzonitrile for compound (1-3), 3,6-difluoro-4-phenylbenzonitrile for compound (1-4), 2-bromo-4-n-dodecyl-6-chlorobenzonitrile for compound (1-5), 3,5-dibromo-4-n-octadecylbenzonitrile for compound (1-6), 3-chloro-4-tert-butylbenzonitrile for compound (1-7), 3-iodo-4-ethyl-6-fluorobenzonitrile for compound (1-8), or 2,6-dicyano-4-phenylbenzonitrile for compound (1-9) in an organic solvent in the presence of alkali at a temperature of 60° C. to 180° C. to obtain a pigment alkali metal salt intermediate;
S2, mixing the pigment alkali metal salt intermediate with a hydrolysis liquid, performing hydrolysis at a temperature of −20° C. to 180° C., and performing a post-treatment to obtain the diketopyrrolopyrrole pigment compound.

3. The preparation method of claim 2, wherein a molar ratio of the alkali to the succinic acid diester is in a range from 0.5:1 to 10:1.

4. The preparation method of claim 2, wherein the succinic acid diester is selected from the group consisting of dialkyl succinate, diaryl succinate, and monoalkyl monoaryl succinate.

5. The preparation method of claim 4, wherein the dialkyl succinate is selected from the group consisting of dimethyl succinate, diethyl succinate, diisopropyl succinate, di-tert-butyl succinate, diamyl succinate, and dicyclohexyl succinate.

6. The preparation method of claim 2, wherein the organic solvent is selected from the group consisting of an alcohol solvent, an ether solvent, a polar aprotic solvent, and combinations thereof.

7. The preparation method of claim 6, wherein the ether solvent is selected from the group consisting of diethyl ether, methyl tert-butyl ether, tetrahydrofuran, 2-methyltetrahydrofuran, and combinations thereof.

8. The preparation method of claim 6, wherein the polar aprotic solvent is selected from the group consisting of N,N-dimethylformamide, N N-dimethylacetamide, N-methylpyrrolidone, dimethyl sulfoxide (DMSO), and combinations thereof.

9. The preparation method of claim 2, wherein the alkali is selected from the group consisting of alkali metal, alkali amide, alkali metal hydride, and alkali metal alkoxide.

10. The preparation method of claim 2, wherein the hydrolysis liquid is selected from the group consisting of water, alcohol, acid, and combinations thereof.

11. The preparation method of claim 2, wherein the post-treatment comprises a step of:
performing a heat treatment in water or an organic solvent or a mixture thereof at a temperature of 50° C. to 200° C. for 10 minutes to 8 hours; and
the preparation method further comprises a step of performing a grinding process before, during, or after the post-treatment.

12. The preparation method of claim 2, further including a step of using the diketopyrrolopyrrole pigment compound, wherein the diketopyrrolopyrrole pigment compound is in a form of wet filter cakes, solid powers or granular formulations to be applicable for coloring of plastics, resins, coating compositions, paints, printing inks, inkjet inks, electrophotographic toners, developers, and liquid crystals.

* * * * *